(12) United States Patent
Reith et al.

(10) Patent No.: US 8,448,289 B2
(45) Date of Patent: May 28, 2013

(54) WINDSCREEN WIPER DRIVE ARRANGEMENT

(75) Inventors: Michael Reith, Buehl-Vimbuch (DE); Gerard Albrecht, Hatten (FR); Verena Lipps, Ottersweier (DE); Roland Bohn, Buehl (DE); Mario Huesges, Buehlertal (DE); Guenther Friderichs, Schwarzach (DE); Paul Geubel, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 1279 days.

(21) Appl. No.: 12/278,818

(22) PCT Filed: Mar. 23, 2007

(86) PCT No.: PCT/EP2007/052779
§ 371 (c)(1),
(2), (4) Date: Aug. 8, 2008

(87) PCT Pub. No.: WO2007/110382
PCT Pub. Date: Oct. 4, 2007

(65) Prior Publication Data
US 2009/0094774 A1    Apr. 16, 2009

(30) Foreign Application Priority Data

Mar. 24, 2006 (DE) .............. 20 2006 019 860 U
Mar. 27, 2006 (DE) .............. 10 2006 013 961

(51) Int. Cl.
*B60S 1/06* (2006.01)

(52) U.S. Cl.
CPC .................................. *B60S 1/06* (2013.01)
USPC ....... 15/250.31; 15/250.3; 277/634; 277/637; 74/18.1; 310/36; 310/37; 310/38; 310/75 R; 310/80; 310/85; 310/89

(58) Field of Classification Search
USPC  15/250.3, 250.31, 250.27, 250.001; 277/634, 277/637; 74/18.1; 310/36, 37, 38, 75 R, 80, 310/85, 88, 89
See application file for complete search history.

(56) References Cited

U.S. PATENT DOCUMENTS

| | | | | |
|---|---|---|---|---|
| 3,790,985 A | * | 2/1974 | Kessler | 15/250.34 |
| 4,428,533 A | * | 1/1984 | Pietryk et al. | 239/284.1 |
| 5,634,726 A | * | 6/1997 | Edele et al. | 384/276 |
| 5,986,371 A | * | 11/1999 | Savy et al. | 310/89 |
| 6,318,735 B1 | * | 11/2001 | Lambeth | 277/634 |
| 7,989,995 B2 | * | 8/2011 | Reith et al. | 310/37 |
| 2003/0213087 A1 | * | 11/2003 | Moein et al. | 15/250.3 |
| 2005/0140224 A1 | * | 6/2005 | Weigold et al. | 310/90 |

FOREIGN PATENT DOCUMENTS

| JP | 2000-071941 A | 3/2000 |
|---|---|---|
| JP | 20071941 A | 3/2000 |

(Continued)

OTHER PUBLICATIONS

Machine language translation of description portion of JP 2000-71941, published Mar. 2000.*

(Continued)

*Primary Examiner* — Gary Graham
(74) *Attorney, Agent, or Firm* — Michael Best & Friedrich LLP

(57) ABSTRACT

The invention relates to a windscreen wiper drive arrangement (1) having a drive shaft (4), extending out of a gear mechanism housing (3), for a windscreen wiper, in which the drive shaft (4) is guided axially through a protective sleeve (15) which is sealed with respect to the drive shaft (4) by means of at least one inner sealing element (18) and with respect to a vehicle component (11) by means of at least one outer sealing element. The invention provides for the protective sleeve (15) to be secured to the gear mechanism housing in order to protect said protective sleeve against axial movement in the direction of the vehicle component (11) and/or against rotational movement relative to the gear mechanism housing (3) by frictional engagement and/or by means of at least one separate securing element (25).

18 Claims, 9 Drawing Sheets

FOREIGN PATENT DOCUMENTS

| | | | |
|---|---|---|---|
| JP | 2001-225726 | * | 8/2001 |
| WO | 96/04156 | A1 | 2/1996 |
| WO | 00/46082 | A1 | 8/2000 |

OTHER PUBLICATIONS

PCT/EP2007/052779 International Search Report.

* cited by examiner

WINDSCREEN WIPER DRIVE ARRANGEMENT

BACKGROUND OF THE INVENTION

The invention relates to a windscreen wiper drive arrangement.

A windscreen wiper drive arrangement is known from DE 299 01 686 U1 comprising a drive motor which is connected via an output shaft to a gear mechanism arranged in a gear mechanism housing. Guided out of the gear mechanism housing is a drive shaft for a windscreen wiper which is driven in an oscillating manner. Conventionally, the drive shaft is guided through an opening in the bodywork or a window, generally the rear window. To avoid water ingress, conventionally a protective sleeve is provided through which the drive shaft is guided in the axial direction. Said protective sleeve is sealed relative to the drive shaft by means of an internal sealing element, for example an O-ring, so that no water is able to run toward the interior along the drive shaft. Moreover, the protective sleeve is sealed by means of an external sealing element, in particular a so-called grommet, relative to the vehicle component through which the drive shaft is guided. It is known to press the protective sleeve provided with an internal cone onto an external cone of the gear mechanism housing, in particular a fixing dome, in the axial direction and thus to produce a non-positive connection between the gear mechanism housing and the protective sleeve.

Such a fastening of the protective sleeve has proved advantageous. As a result of external influences, in particular as a result of continuous shaking movements during travel or during repair work, however, the frictional connection between the protective sleeve and the gear mechanism housing may be released, which may result in the protective sleeve being able to move in the axial direction and/or in the peripheral direction. As a result, firstly there is the risk that the protective sleeve during operation of the windscreen wiper moves in an oscillating manner together with the drive shaft, which leads to greater wear of the internal sealing element. Moreover, the protective sleeve may become skewed such that an effective seal relative to the drive shaft and/or relative to the vehicle component, through which the drive shaft is guided, is no longer ensured. It leads to water ingress, in particular into the gear mechanism and/or motor housing and thus to increased occurrence of wear and an electrical short circuit.

SUMMARY OF THE INVENTION

The object of the invention is to provide an improved wiper drive arrangement in which the risk of failure of the seal is minimized.

The idea underlying the invention, additionally or alternatively to pressing the protective sleeve onto a gear mechanism housing portion, i.e. an exclusively non-positive and/or frictional connection, is to provide a positive connection between the protective sleeve and the gear mechanism housing and/or a separate fixing element for fixing the protective sleeve to the gear mechanism housing, in order to avoid a relative axial movement of the protective sleeve in relation to the gear mechanism housing in the direction of the vehicle component and/or in the peripheral direction. By the additional or alternative securing means for the frictional connection, increased wear of the seal, in particular between the protective sleeve and drive shaft, may advantageously be avoided, as the protective sleeve always maintains a precisely defined position relative to the sealing elements and the drive shaft. An inadvertent release of the protective sleeve from said defined relative position is advantageously avoided. Due to the provision of a positive connection and/or a separate fixing element, substantially greater moments may be absorbed and/or cushioned by the protective sleeve.

In principle, various possibilities exist for ensuring an additional or alternative securing and/or fixing of the protective sleeve to the gear mechanism housing.

According to an advantageous embodiment of the invention, the protective sleeve and a portion of the gear mechanism housing, preferably a fixing dome of the gear mechanism housing, engage in a mutually interlocking manner. As a result of this positive connection, a rotation of the protective sleeve relative to the gear mechanism housing is avoided. In addition to this securing against a movement in the peripheral direction, the protective sleeve may be secured against an axial movement. To this end, the axial fixing may, for example, be produced by a further positive connection of the protective sleeve with the gear mechanism housing. A support of the protective sleeve in the axial direction on a component supported on the drive shaft, in particular a speed nut, or a radial portion configured integrally with the drive shaft is also conceivable.

Additionally or alternatively, in a development of the invention it is provided to latch the protective sleeve to the gear mechanism housing. In this connection, the at least one latching mechanism may be configured such that it secures the protective sleeve exclusively against a relative axial movement or exclusively against a rotational movement relative to the gear mechanism housing. Preferably, however, the protective sleeve is latched to the gear mechanism housing such that both degrees of freedom are eliminated.

According to a preferred embodiment, it is provided that the latching means are arranged for fixing the protective sleeve to the gear mechanism housing on a latching arm of the protective sleeve facing in the direction of the gear mechanism housing. For example, the latching arm, preferably at its free end, comprises a recess which engages in a latching lug of the gear mechanism housing. It is also conceivable to transpose the latching lug and the recess.

A particularly secure and fixed connection between the protective sleeve and the gear mechanism housing is maintained when the protective sleeve is calked to the gear mechanism housing. To this end, the protective sleeve preferably comprises at least one opening through which an extension of the gear mechanism housing, generally consisting of cast aluminium, projects. After positioning the protective sleeve, the extension, in particular by the effect of impact, is widened at its free end such that the protective sleeve may no longer be pulled off the extension. As a result of the calking, the protective sleeve is secured both in the axial and in the peripheral direction.

Additionally or alternatively, it is advantageous to rivet the protective sleeve to the gear mechanism housing by means of individual rivets.

In a development of the invention, it is advantageously provided to secure the protective sleeve on the gear mechanism housing by means of a double-locking speed nut. A double-locking speed nut comprises resilient elements both on its internal periphery and on its external periphery, which is under tension with and/or bites into the gear mechanism housing, in particular the fixing dome, on the one hand, and, on the other hand, the protective sleeve.

BRIEF DESCRIPTION OF THE DRAWINGS

Further advantages and expedient embodiments may be derived from the further claims, the description of the figures and the drawings, in which:

DETAILED DESCRIPTION

Figure 1:
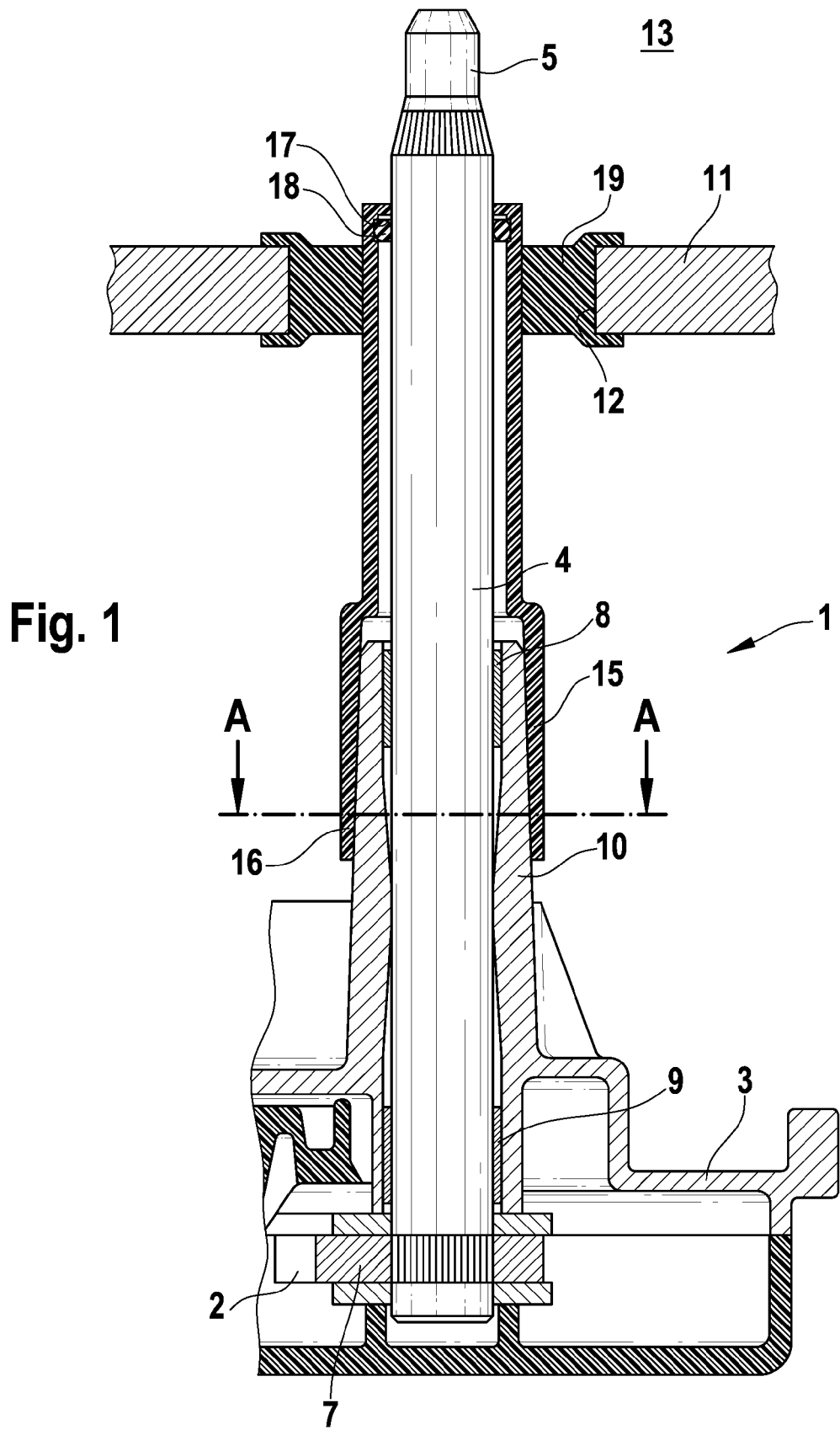
FIG. 1 shows a sectional view of a windscreen wiper arrangement comprising a protective sleeve, which is positively connected to a gear mechanism housing by means of interlocking.

The same components and components with the same function are identified in the figures by the reference numerals.

In FIG. 1 a windscreen wiper drive arrangement 1 is shown for a motor vehicle. An electric drive motor, not shown, is connected to a gear mechanism 2 via an output shaft, also not shown. The partially shown gear mechanism 2 is arranged inside a partially shown gear mechanism housing 3 made of aluminum. By means of the motor and the gear mechanism 2, a drive shaft 4 is driven in an oscillating manner. A wiper arm may be fixed to the free end 5 of the drive shaft 4 guided out of the gear mechanism housing 3. On the drive shaft 4 is located a gear wheel 7 which meshes with a toothed element of the gear mechanism 2. The drive shaft 4 is mounted by means of two spaced-apart bearings 8, 9 inside the gear mechanism housing 3 in the axial direction as well as in the radial direction. The front bearing 8 is located in a fixing dome 10 of the gear mechanism housing 3 which surrounds the drive shaft 4 over part of its longitudinal extension in the peripheral direction.

The drive shaft 4 is passed out of the gear mechanism housing 3 and/or the fixing dome 10 and at a distance thereto through a vehicle component 11, in particular a bodywork panel or a window pane. To this end, an opening 12 is provided in the vehicle component 11.

So that from the outside 13 of the vehicle no water is able to penetrate in the direction of the gear mechanism 2, a protective sleeve 15 is provided with circular internal and external cross-sectional surfaces. The protective sleeve is pressed with its conically widened end region 16 onto the conically tapered fixing dome 10 in the axial direction in the direction of the vehicle component 11. In a groove 17 on the internal periphery of the protective sleeve 15 an internal sealing element 18, configured as an O-ring, is arranged. Said O-ring bears against the entire periphery of the drive shaft 4 and prevents penetration of water from the outside 13 into the interior of the protective sleeve 15. With an oscillating movement of the drive shaft 4, said drive shaft slides along the internal periphery of the internal sealing element 18. In order to prevent water ingress between the external periphery of the protective sleeve 15 and the opening edge of the opening 12 in the direction of the gear mechanism housing 3, an external sealing element 19 is provided inside the opening 12, in particular a grommet held on the peripheral edge of the opening 12. Said sealing element bears sealingly against the external periphery of the protective sleeve 15.

Should the frictional connection between the fixing dome 10 and the internal periphery of the protective sleeve 15 be released, rotation of the protective sleeve 15 in the peripheral direction is avoided by the positive connection between the protective sleeve 15 and the fixing dome 10.

The positive connection between the protective sleeve 15 and the fixing dome 10 is shown in detail in FIG. 2 to FIG. 7. As is revealed from FIG. 2, inwardly facing teeth 20 with a triangular cross section (see FIG. 3) are provided on the internal periphery extending in the axial direction and radially spaced apart in the peripheral direction. Said teeth engage in recesses, not shown, on the external periphery of the fixing dome 10.

Additionally or alternatively, radially outward facing teeth 21 which extend in the axial direction and are spaced apart on the external periphery of the fixing dome 10 in the peripheral direction, are provided and engage in recesses of complementary shape, not shown, on the internal periphery of the protective sleeve 15. As a result of the interlocking of the protective sleeve 15 with the fixing dome 10, a relative rotational movement between the protective sleeve 15 and the gear mechanism housing 10 is advantageously avoided. The pressing-on merely has the function of securing the protective sleeve 15 against axial displacement. If the pressing-on is eased, the protective sleeve may not rotate but may be axially displaced in the direction of the vehicle component 11. If required, the pressing-on may be entirely dispensed with, in particular when an axial displacement movement is prevented by a positive connection or a separate fixing element.

Figure 2:
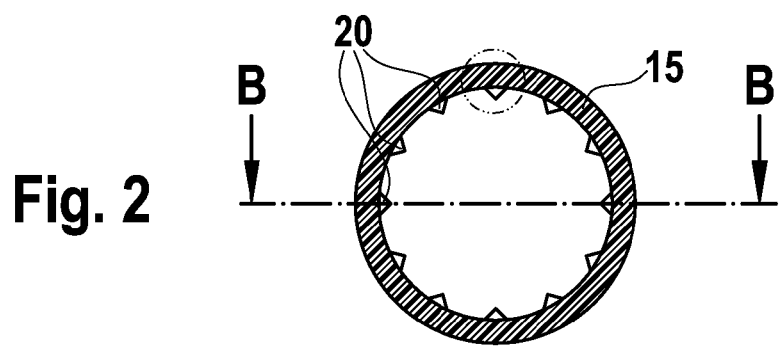
FIG. 2 shows a sectional view of the protective sleeve along the cutting line A-A according to FIG. 1.
Figure 3:
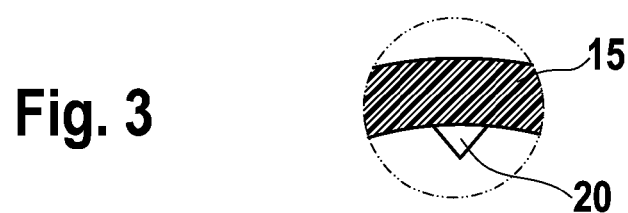
FIG. 3 shows an enlarged detail of FIG. 2.
Figure 4:
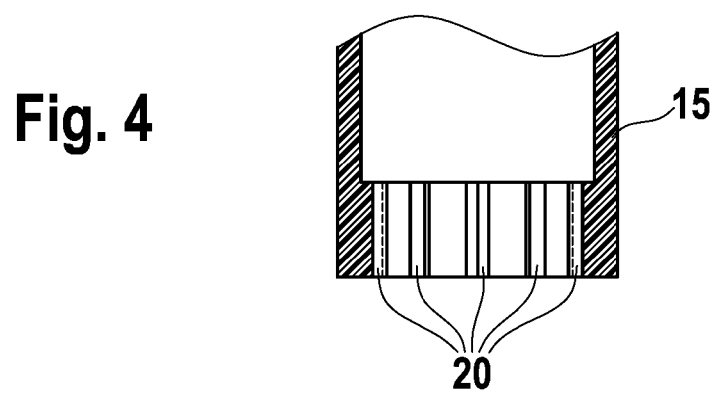
FIG. 4 shows a sectional view of the protective sleeve along the cutting line B-B according to FIG. 2.
Figure 5:
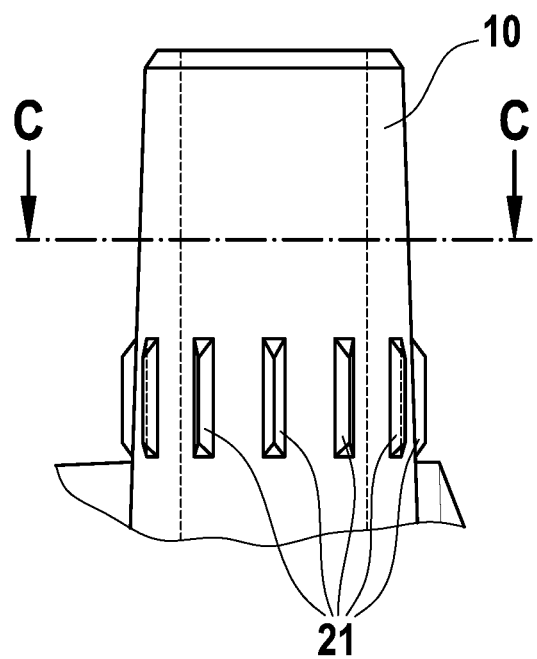
FIG. 5 shows a side view of the fixing dome of the gear mechanism housing.
Figure 6:
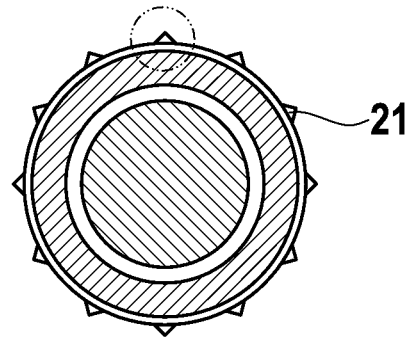
FIG. 6 shows a sectional view of the fixing dome, with the drive shaft located on the inside, along the cutting line C-C according to FIG. 5.
Figure 7:
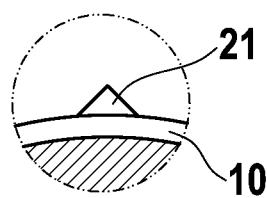
FIG. 7 shows an enlarged detail of FIG. 6.

It is also conceivable that the two sets of teeth 20, 21 shown in FIGS. 2 and 6 interlock. In this case, the teeth 20, 21 are supported against one another in the peripheral direction. As clearances are formed, with such a positive connection which is not configured to be complementary in shape in the axial direction, it is possible, however, that water which has penetrated is able to run down through said clearances in the direction of the outside of the gear mechanism housing 3.

Figure 8:
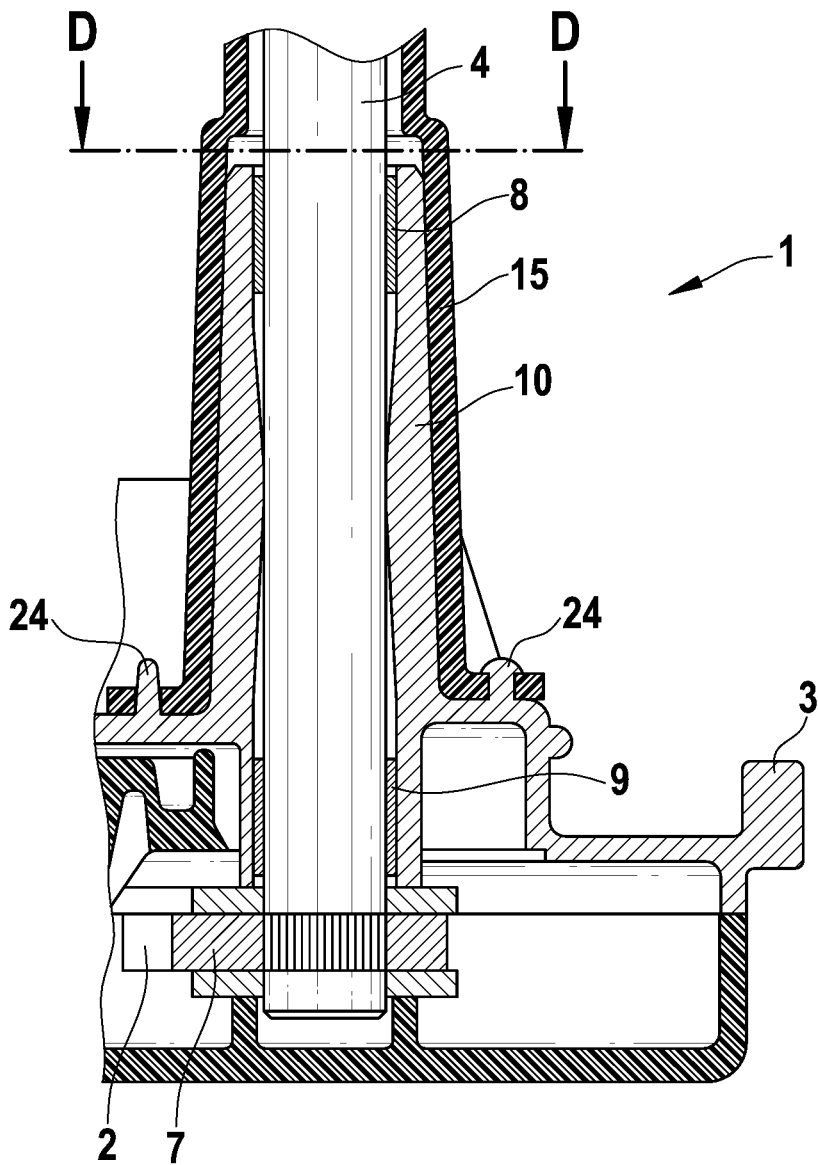
FIG. 8 shows a sectional view of a windscreen wiper drive arrangement, in which the protective sleeve is calked to the gear mechanism housing.
Figure 9:
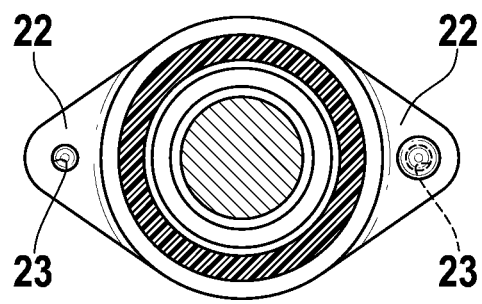
FIG. 9 shows a sectional view of the protective sleeve along the cutting line D-D according to FIG. 8.

In FIGS. 8 and 9, an alternative embodiment is shown. The protective sleeve 15 which is only shown partially is pushed onto the fixing dome 10 of the gear mechanism housing 3, but not pressed-on. The securing against an axial movement as well as a rotational movement of the protective sleeve 15 is implemented by calking the components (15, 10). To this end, two bearing portions 22 and/or bearing tabs are provided on the protective sleeve 15 encompassing the drive shaft 4, which are opposed in the axial direction, arranged slightly offset relative to one another and extend in the transverse direction relative to the axial extension of the protective sleeve 15. Each bearing portion 22 comprises an opening 23 through which one respective extension 24 is guided and which is configured integrally with the gear mechanism housing 3 made of cast aluminum. In the respective right-hand half of the drawing of FIGS. 8 and 9, the extension 24 already calked by pressing is shown. The free end of the extension 24 is thus widened, such that it may no longer be passed through the opening 23. In the left-hand half of the drawing the calking step has not yet been carried out. The, as yet, unaltered extension 24 passed through the opening 23 may be identified. The extensions 24 prevent a rotation of the protective sleeve 15. The securing in the axial direction is ensured by the widened heads of the extensions 24.

Figure 10:
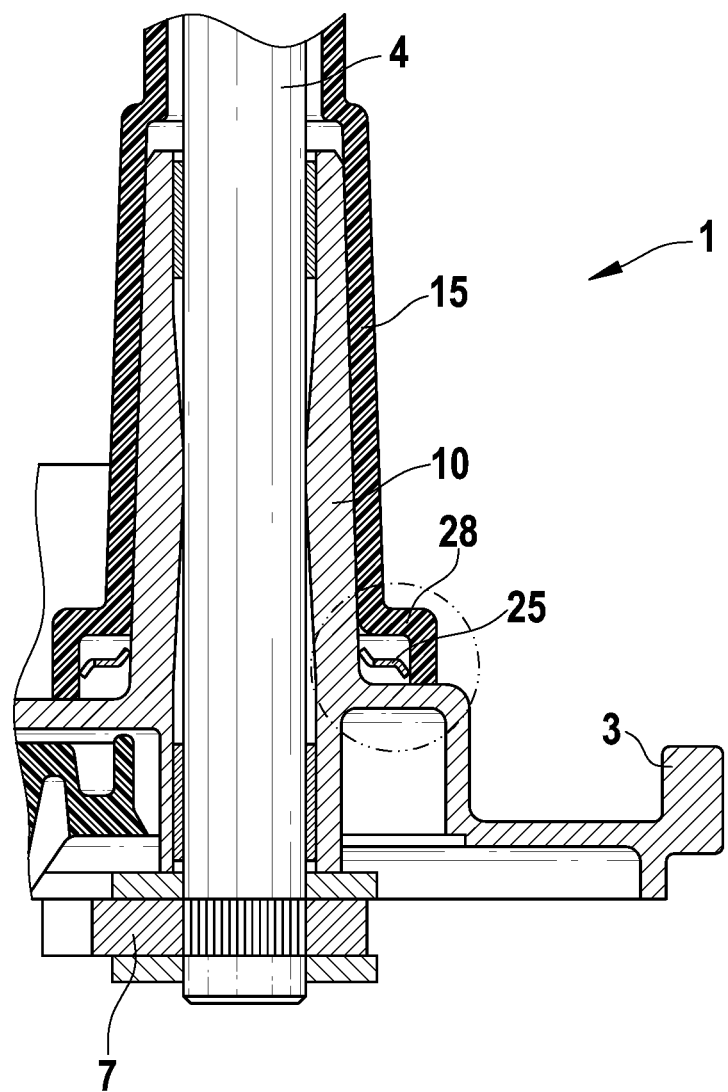
FIG. 10 shows a windscreen wiper drive arrangement, in which the protective sleeve is fixed to the fixing dome of the gear mechanism housing by means of a double-locking speed nut.
Figure 11:
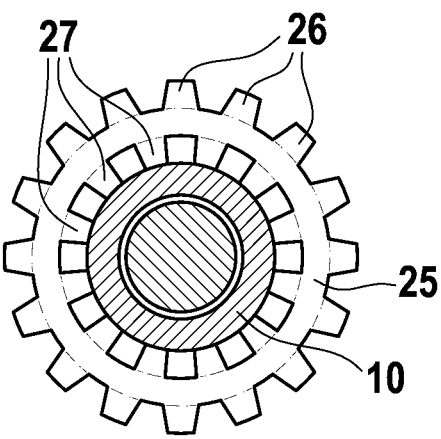
FIG. 11 shows a view of the speed nut fixed to the protective sleeve.
Figure 12:
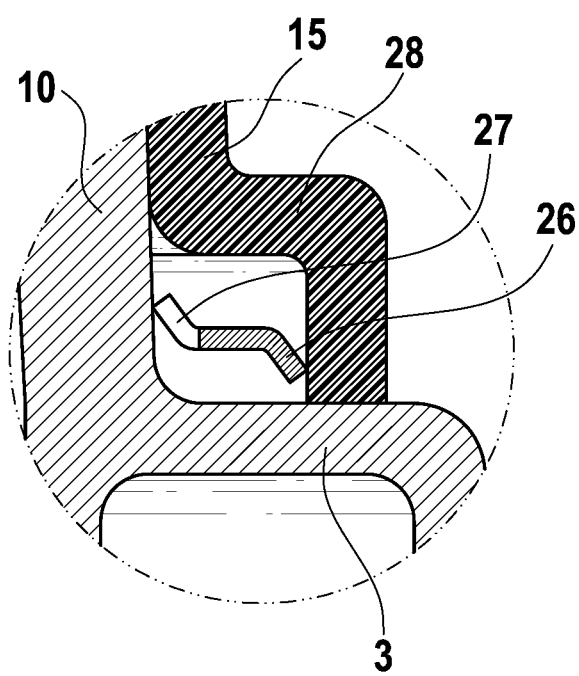
FIG. 12 shows an enlarged detail of FIG. 10.

In the embodiment shown in FIG. 10, the protective sleeve 15 is also slipped over the fixing dome 10 of the gear mechanism housing 3. Optionally, the protective sleeve made of plastics may be pressed onto the fixing dome 10. For securing against an axial movement of the protective sleeve as well as rotation of the protective sleeve 15, the protective sleeve 15 is connected to the gear mechanism housing 3 by means of the fixing element 25 shown in detail in FIG. 11 and configured as a double-locking speed nut. The double-locking speed nut 25 comprises resilient, spaced-apart, radially outwardly facing tabs 26 on the external periphery in the peripheral direction, and on its internal periphery radially inwardly facing tabs 27. By means of the outer tabs 26, the double-locking speed nut 25 bites into the internal periphery of a lower projection of the protective sleeve 15. By means of its inner tabs 27, the double-locking speed nut bites into the external periphery of the fixing dome 10. This may be seen in detail in FIG. 12. The inner tabs 27 are axially bent upwards in the direction of the free end of the fixing dome 10, in contrast to which the outer tabs 26 are bent back in the opposing direction. For example, the double-locking speed nut 25 is initially under tension inside the projection 28 of the protective sleeve 15, whereupon the unit made up of the protective sleeve 15 and the double-locking speed nut 25 is pushed thereon from the free end of the fixing dome 10.

Figure 13:
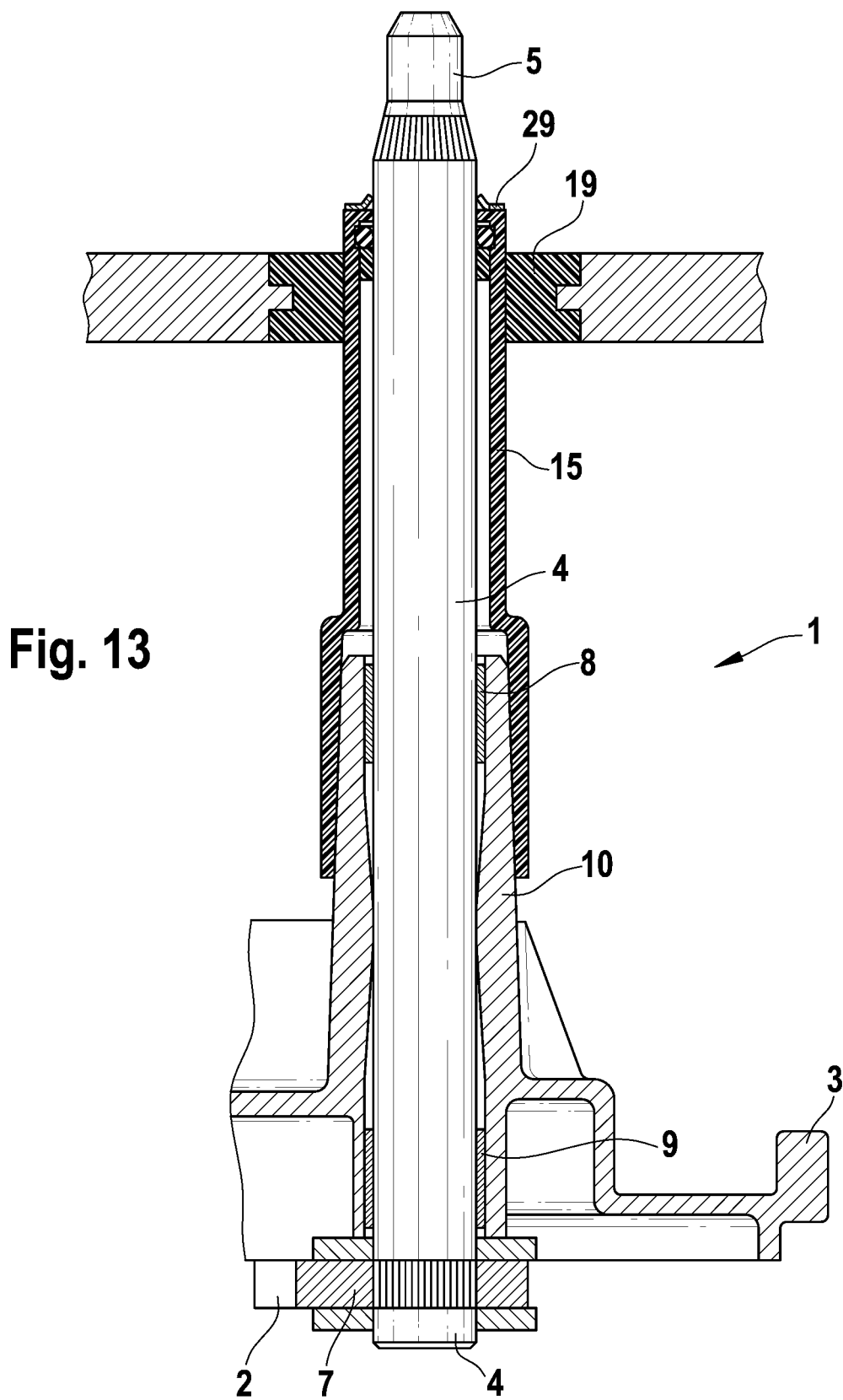
FIG. 13 shows a windscreen wiper arrangement, in which the protective sleeve is positively connected to the gear mechanism housing and is additionally secured in the axial direction by means of a speed nut.
Figure 14:
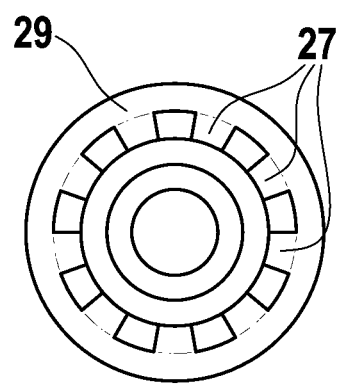
FIG. 14 shows a view of the speed nut.

In the embodiment according to FIG. 13, an additional securing element 29 is provided in addition to the interlocking between the protective sleeve 15 and the fixing dome 10. Said securing element is configured as a speed nut (see FIG. 14). The speed nut 29 comprises on the internal periphery resilient tabs 27 and/or claws with which it bites into the smooth drive shaft 4. After mounting the protective sleeve 15 on the fixing dome 10, the securing element 29 is pushed from the free end 5 of the smooth drive shaft 4 thereon, until bearing against the front face of the protective sleeve 15. At the same time, the tabs 27 are lifted and thus prevent an axial displacement of the fixing means 29 counter to the slip-on direction and thus secure the protective sleeve 15 in the axial direction on the fixing dome 10.

Figure 15:
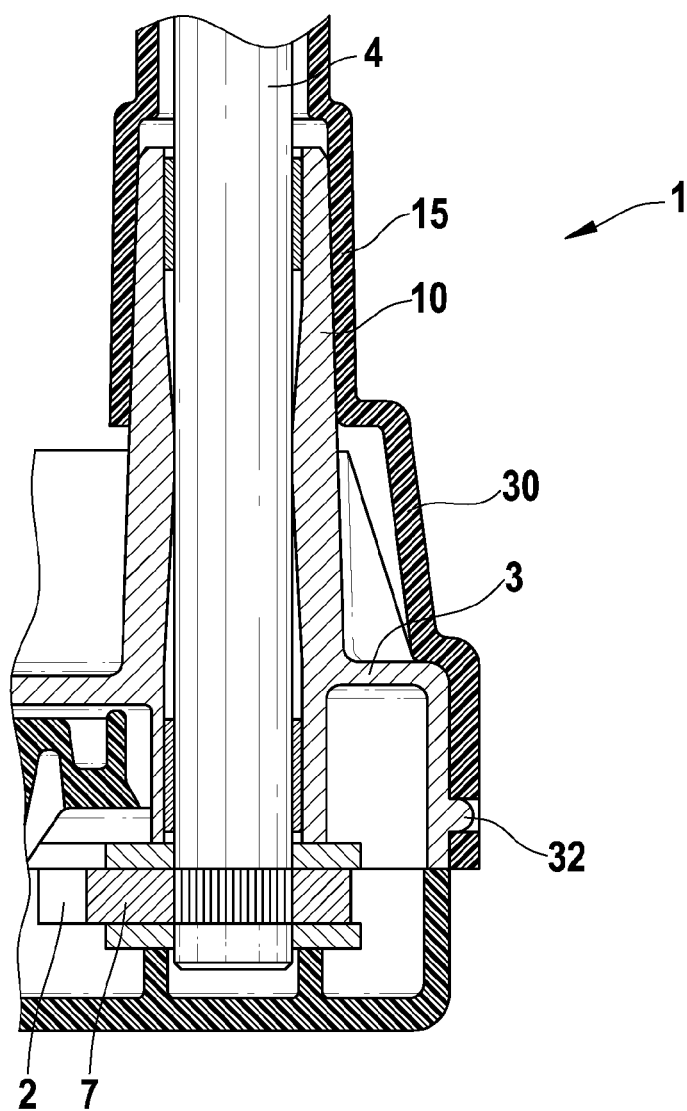
FIG. 15 shows a windscreen wiper drive arrangement in which the protective sleeve 15 is latched to the gear mechanism housing 3.
Figure 16:
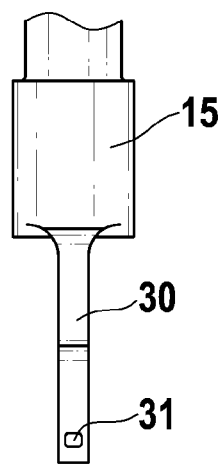
FIG. 16 shows a view of a latching arm rotated by 90° relative to FIG. 15.

In FIG. 15 a further embodiment of windscreen wiper drive arrangement 1 is shown. The protective sleeve 15 is pressed onto the fixing dome 10. Additionally, a latching arm 30 is provided, extending in the direction of the gear mechanism housing 3 and resilient transversely to the axial direction. Said latching arm comprises, as shown in FIG. 16 in detail, at its free end a recess 31 with which it is pushed onto a latching lug 32 of the gear mechanism housing 3. As a result of this latching, any movement of the protective sleeve is prevented relative to the gear mechanism housing 3.

The invention claimed is:

1. A windscreen wiper drive arrangement comprising a drive shaft (4) guided out of a gear mechanism housing (3) for a windscreen wiper, the drive shaft (4) being axially guided through a protective sleeve (15), which is sealed by at least one internal sealing element (18) relative to the drive shaft (4) and by at least one external sealing element (19) relative to a vehicle component (11), characterized in that the protective sleeve (15) is secured to the gear mechanism housing by at least one securing means securing against an axial movement in the direction of the vehicle component (11) and a rotational movement of the protective sleeve (15) relative to the gear mechanism housing (3), characterized in that the protective sleeve (15) includes a conically widened end region (16) and the gear mechanism housing (3) includes a conically tapered fixing dome (10), and characterized in that the securing means includes an engagement between the conically widened end region (16) and the conically tapered fixing dome (10).

2. The windscreen wiper drive arrangement as claimed in claim 1, characterized in that the at least one securing means includes an internal toothing on the internal periphery of the protective sleeve (15) having teeth (20) spaced apart in the peripheral direction, which engage in an external toothing (21) of the gear mechanism housing (3).

3. The windscreen wiper device arrangement as claimed in claim 2, characterized in that at least one securing element (29) supported on the drive shaft (4) is provided for securing the protective sleeve (15) against axial displacement.

4. The windscreen wiper device arrangement as claimed in claim 3, characterized in that the securing element (29) is configured as a speed nut which may be pushed onto the drive shaft (4).

5. The windscreen wiper device arrangement as claimed in claim 1, characterized in that the protective sleeve (15) is latched to the gear mechanism housing (3).

6. The windscreen wiper device arrangement as claimed in claim 5, characterized in that at least one resilient latching arm (30) is provided, integrally configured with the protective sleeve (15) and facing in the direction of the gear mechanism housing (3), which engages with a latching means (31) positively in a counter latching means (32) of the gear mechanism housing (30).

7. The windscreen wiper device arrangement as claimed in claim 6, characterized in that the protective sleeve (15) is calked to the gear mechanism housing (3).

8. The windscreen wiper device arrangement as claimed in claim 1, characterized in that the protective sleeve (15) is calked to the gear mechanism housing (3).

9. The windscreen wiper device arrangement as claimed in claim 8, characterized in that the protective sleeve (15) has at least one bearing portion (22) extending transversely to its axial extension with at least one opening (23) for the passing-through and subsequent calking of an extension (24) of the gear mechanism housing (3).

10. The windscreen wiper device arrangement as claimed in claim 1, characterized in that the protective sleeve (15) is riveted to the gear mechanism housing.

11. The windscreen wiper device arrangement as claimed in claim 1, characterized in that the at least one securing means includes a double-locking speed nut, which is under tension, with respect to the gear mechanism housing (3) and, with respect to the protective sleeve (15).

12. The windscreen wiper device arrangement as claimed in claim 1, characterized in that the protective sleeve (15) has at least one bearing portion (22) extending transversely to its axial extension with at least one opening (23) for the passing-through and subsequent calking of an extension (24) of the gear mechanism housing (3).

13. The windscreen wiper device arrangement as claimed in claim 12, characterized in that the protective sleeve (15) is riveted to the gear mechanism housing.

14. The windscreen wiper device arrangement as claimed in claim 12, characterized in that the protective sleeve (15) includes at least one bearing portion (22) extending transversely to an axial extension of the sleeve, and the bearing portion is riveted to the gear mechanism housing.

15. The windscreen wiper drive arrangement as claimed in claim 1, characterized in that the at least one securing means includes an internal toothing on the internal periphery of the protective sleeve (15) having teeth (20) spaced apart in the peripheral direction, which engages in an external toothing (21) of the gear mechanism housing (3) which is complementary in shape.

16. The windscreen wiper device arrangement as claimed in claim 1, characterized in that the protective sleeve (15) includes at least one bearing portion (22) extending transversely to an axial extension of the sleeve, and the bearing portion is riveted to the gear mechanism housing.

17. The windscreen wiper device arrangement as claimed in claim 1, characterized in that the securing means includes a press-fit between a portion of the protective sleeve (15) and a portion of the gear mechanism housing (3).

18. The windscreen wiper device arrangement as claimed in claim 17, characterized in that the securing means further includes interengaging members on a portion of the gear housing (3) and on a portion of the protective sleeve (15).

* * * * *

UNITED STATES PATENT AND TRADEMARK OFFICE
CERTIFICATE OF CORRECTION

PATENT NO. : 8,448,289 B2  Page 1 of 1
APPLICATION NO. : 12/278818
DATED : May 28, 2013
INVENTOR(S) : Reith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1282 days.

Signed and Sealed this
Eighth Day of September, 2015

Michelle K. Lee
*Director of the United States Patent and Trademark Office*